United States Patent
Gate

(10) Patent No.: US 7,350,743 B1
(45) Date of Patent: Apr. 1, 2008

(54) MISSILES AND CONTROL SYSTEMS THEREFOR

(75) Inventor: Martin S. Gate, Hatfield (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 07/052,111

(22) Filed: Apr. 24, 1987

Related U.S. Application Data

(63) Continuation of application No. 06/443,300, filed on Sep. 28, 1982, now abandoned.

(30) Foreign Application Priority Data

Sep. 29, 1981 (GB) .................................. 8129316

(51) Int. Cl.
*F41G 7/22* (2006.01)
(52) U.S. Cl. ..................... 244/3.15; 244/3.21
(58) Field of Classification Search ............... 244/3.15, 244/3.16, 3.19, 3.21
See application file for complete search history.

(56) References Cited

U.S. PATENT DOCUMENTS

| | | | | |
|---|---|---|---|---|
| 3,065,931 A | * | 11/1962 | Dixon et al. | 244/3.16 |
| 3,072,365 A | * | 1/1963 | Linscott et al. | 244/3.19 |
| 4,288,050 A | * | 9/1981 | Gauggel | 244/3.16 |
| 4,711,412 A | * | 12/1987 | Wallermann | 244/3.15 |

* cited by examiner

*Primary Examiner*—Timothy D. Collins
(74) *Attorney, Agent, or Firm*—Nixon & Vanderhye P.C.

(57) ABSTRACT

A homing missile of which the target tracker has a restricted, e.g. a slit-shaped, field-of-view and which incorporates means whereby the field-of-view may be rotated, e.g. by rolling the missile, has a control system which to avoid certain instability problems, such as adverse autopilot coupling, imposed or made worse by the restricted field, includes first limiting means for limiting the demanded rotation of the field-of-view and second limiting means for limiting one lateral axis missile steering signal. The other lateral axis steering signal is modified in dependence upon the one steering signal and the rotation demand signal to optimise control having regard to the restricted view-field.

8 Claims, 2 Drawing Sheets

MISSILES AND CONTROL SYSTEMS THEREFOR

Figure 1:
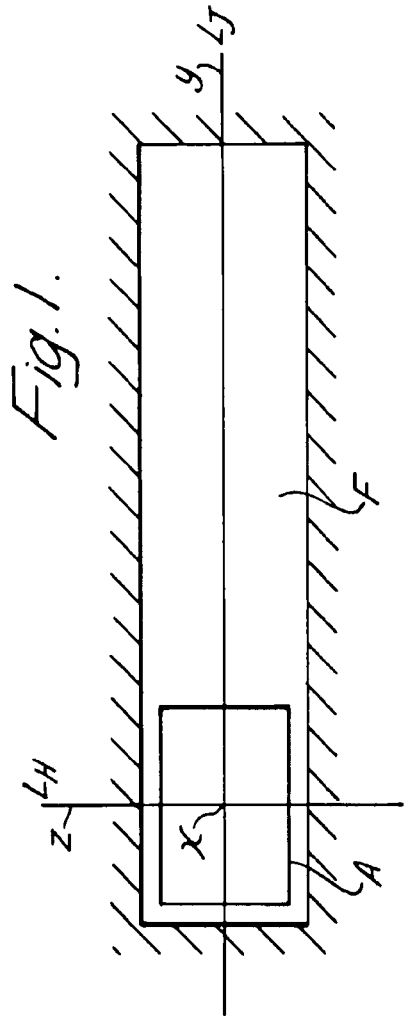

This is a continuation of application Ser. No. 06/443,300, filed Sept. 28, 1982, which was abandoned upon the filing hereof.

This invention relates to homing missiles and control systems therefor.

A homing missile will generally comprise a target tracker mounted in the missile tip, which tip is formed as a window giving the tracker a field-of-view extending forwardly from the missile tip and, evenly and symmetrically, all around the missile roll axis. Normally the tracker is spatially stabilised, for example by gyroscopic means, so that it maintains its view of the target despite manoeuvring of the missile, and that spatially stabilised position is controlled, for example by gyro precessing means, so that it maintains its view of the target despite relative movement of missile and target which produces a change in the direction of the line-of-sight between missile and target. Meanwhile, in response to signals indicative of the relative position of the target tracker and the missile, a control system guides the missile according to some chosen navigation law to intercept the target.

It may be advantageous to move the target tracker and its window back away from the missile tip, the shape and material of the tip can then be optimized, say for the high degree of kinetic heating at this point, without having to consider transparency and lack of distortion for the tracker-sensitive radiation, while the window may become less subject to and/or more easily protectable against such kinetic heating. Then, however, it may be difficult or impossible to provide the tracker with an all around field-of-view. In fact, it is not inherently essential that the tracker should have an all around field-of-view since, theoretically at least, it is possible, say by manoeuvring the missile and target tracker, to move the restricted field-of-view. For example, if the field-of-view is of rectangular cross-section and extends between the roll axis and one side only of the missile, then the missile and tracker can be rolled around to maintain the target within the restricted field. Now, however, due mainly to limitations in the capabilities of available target trackers, the space stabilising means for the tracker, and control systems, particularly the autopilot guidance system which generally forms part of such a control system, problems of instability may arise and/or it may simply not be possible to move the tracker fast enough to keep the target in view.

An object of the present invention is to provide a control system for a missile of which the target tracker has a restricted field-of-view, the system nevertheless permitting adequate performance for navigating the missile to target interception. A preferred further object is to provide a control system which in some circumstances, is able to tolerate some loss of sight of the target by the target tracker.

According to the present invention, there is provided a homing missile comprising a target tracker and drive motor means for producing relative movement of members comprised in the missile including control members for steering the missile in a lateral direction, the missile being such that said target tracker has a field-of-view which is restricted at any instant to less than an all-around field-of-view and, to compensate for said restriction, said drive motor means is operable for rotating the said restricted field-of-view with respect to the missile roll axis, for example by controlling roll of the missile itself, the missile further comprising a control system connected between said target tracker and said drive motor means and including look-angle demand signal deriving means for deriving signals indicative of desired positions of a target relative to the missile, said signals including lateral steering signals and also including angle signals indicative of the angular arguments of the polar coordinates of said desired position, first limiting means connected to said signal deriving means to receive said angle signals and for limiting these signals to between two limit values, signal processing means for receiving said limited angle signals and for forming therefrom signals for controlling the rotation of said field-of-view by said drive motor means, second limiting means for receiving said lateral steering signals and limiting them to less than a limit value, and combining means connected to said first and second limiting means and said drive motor means and operable for combining the limited angle signals and the limited lateral steering signals to form steering control signals for controlling lateral steering of the missile.

For a better understanding of the invention, reference will now be made, by way of example, to the accompanying drawings in which: —

Figure 3:
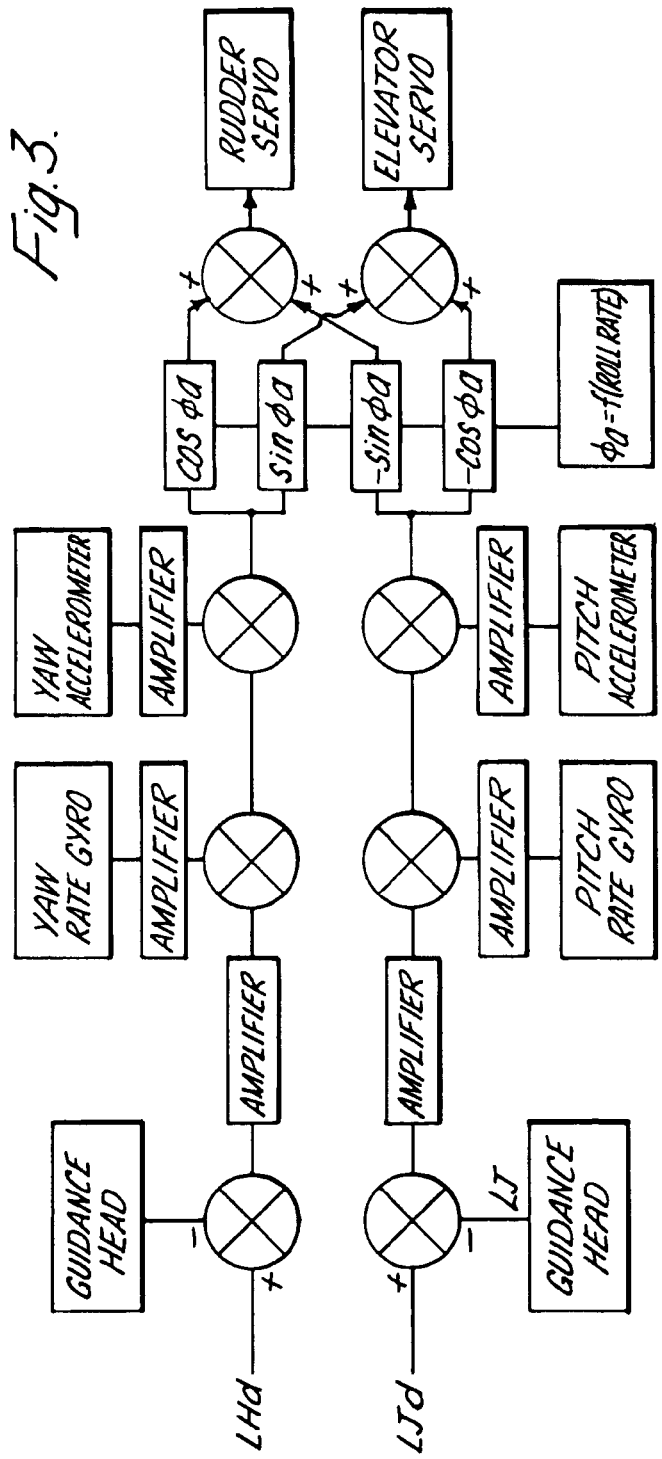
Figure 2:
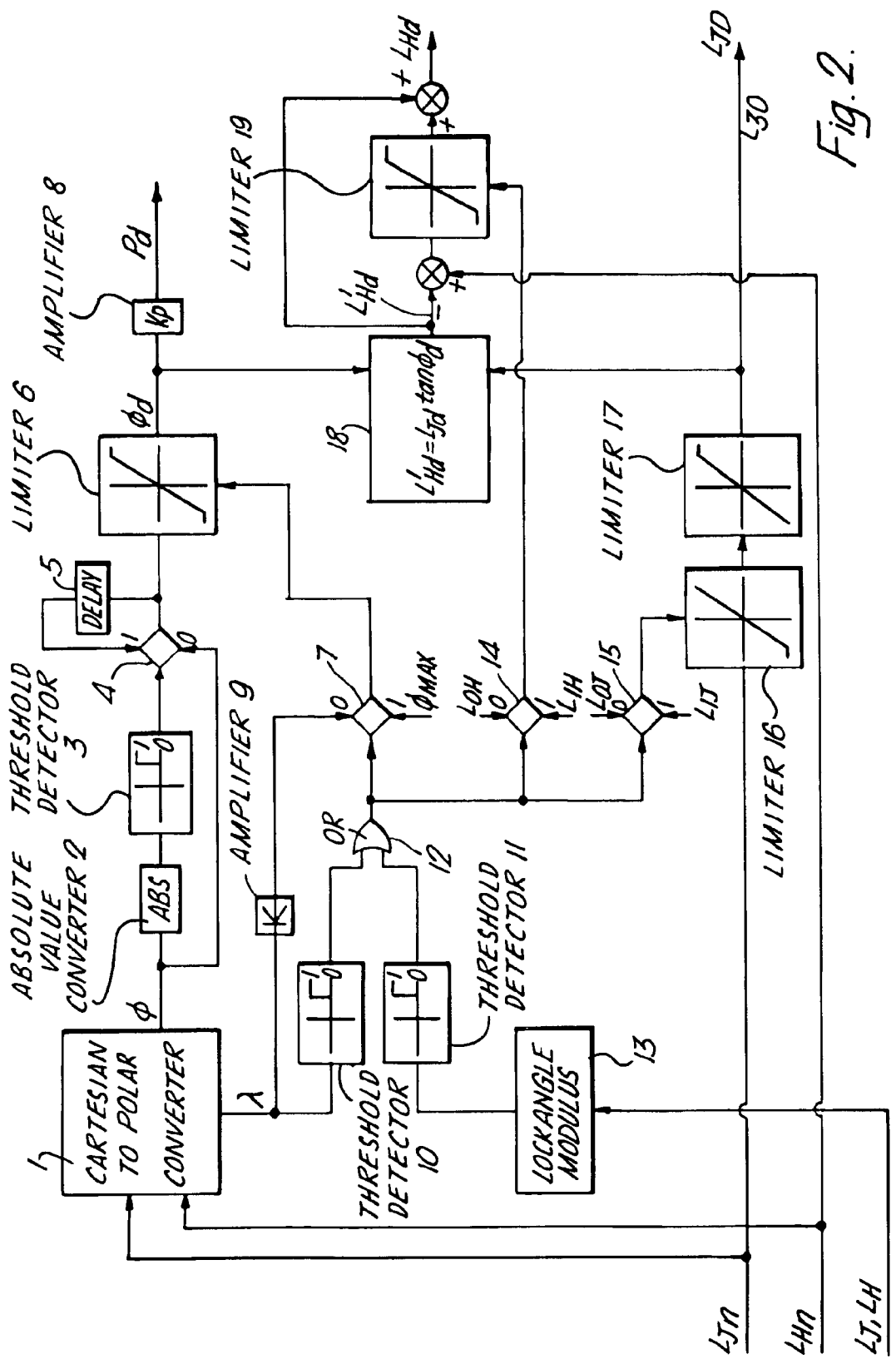

FIG. 1 is a diagram illustrating the restricted field-of-view of the target tracker of a homing missile, FIGS. 2 and 3 are simplified circuit diagrams of respective parts of the control system of the missile.

The control system to be described is for use in a missile (not shown) having a gyro stabilised target tracker (not shown) with a narrow rectangular or slit-shaped field-of-view F as shown in FIG. 1. The field F includes but is asymmetrically disposed with respect to the missile roll axis X. Axes Y and Z are Cartesian axes by reference to which there can be defined respective coordinates LH and LJ indicative of an actual position of a target relative to the missile and coordinates LHn and LJn indicative of a demanded or desired position of the target relative to the missile, i.e. these latter coordinates are those at which the missile control system wants the target to be having regard to the chosen navigation law for the missile flight. In effect, LJ and LH and LJn and LHn define actual and demanded look angles between roll axis X and the sight line to the target. The demands LJn and LHn may be derived by a part of the control system constructed according to known techniques and in accordance with any chosen navigation law which may be a standard known law. By way of example, the law may provide 'Acceleration Vectored Navigation' as described in Guided Weapon Control Systems by P. Garnell and D. J. East (Pergamon Press 1977) Section 9.9. This reference also provides information about examples of the construction and design of parts of the missile and its control system, such as the tracker and the control system part which derives LJn and LHn, which may be standard and are not shown herein. For the example being described, it is assumed that the responses by the missile to the navigation demands for desired lateral look-angle values (LJn and LHn) are approximately linear in axes not spinning about the missile but corresponding to it.

The part of the control system shown in FIG. 2 receives the demands LJn and LHn and modifies them in accordance with constraints imposed by the limited field-of-view F. In order to move the field-of-view F to maintain its view of the target, it is assumed that the missile and the target tracker are to be rolled about axis X. This invention is still of course relevant if such rolling does not take place. Other compensating manoeuvres of the missile can achieve rotational movement of the field or some mechanism for relatively moving different parts of the missile can be used to achieve movement of the field in addition or alternatively to manoeuvring the missile.

Within the control system part of FIG. 2, the Cartesian components LJn and LHn are fed to a converter device 1 which may be of known construction and which converts the components to polar coordinates λ, Ø where: —

$$\emptyset = \begin{cases} (\arg(LJn, LHn) & -\pi < \emptyset \leq \pi \\ 0 & \text{otherwise} \end{cases}$$

and amplitude $$\lambda = \sqrt{(LJn^2 + LHn^2)}$$

Block 2 computes the absolute value of Ø and block 3 is a threshold detector of which the output signal controls a logic changeover switch 4. If the threshold value of detector 3 is not exceeded, switch 4 passes the current value of Ø from the converter 1 to a limiter 6. This current value is also fed via a delay unit 5 to the second input of switch 4, which input thereby has available a value of Ø previous to the current value. If, due to noise or sudden perturbations, the threshold value of detector 3 is exceeded, switch 4 passes this previous value of Ø onto the limiter 6 rather than the current value thereby reducing the tendency towards violent missile manoeuvres that might otherwise result. The function of the limiter 6 is to provide a value Ø which is equal to the received value of Ø if that value lies between positive and negative limits or which, if the magnitude of Ø equals or exceeds that of each limit, is of the same sign as the received value of Ø but has a magnitude equal to the limit value. The magnitude of each limit imposed by limiter 6 is controlled by a logic changeover switch 7. It is either the polar coordinate magnitude λ multiplied, at gain element 9, by a gain factor K or it comprises a value Ømax derived as described later. The control of switch 7, and hence the choice of which of the two mentioned limit values is imposed by limiter 6 is also described later. The output value Ød from the limiter 6 is multiplied by a gain $K_p$ 8 to give the demand Pd to a roll rate control system. Filtering of Pd using standard techniques may be required.

The magnitude output λ from converter 1 is also fed as an input to threshold detector 10 from which a 0 or 1 logic output goes to the OR gate 12. The other input to gate 12 is derived from a threshold detector 11. The input to detector 11 comprises a signal indicative of the target sight line separation from the missile axis. This signal is calculated by a modulus forming device from the actual target position signals LH and LJ supplied by the target tracker. For example the signal could be calculated as $\sqrt{LH^2 + LJ^2}$. The output Bd from gate 12 is used to operate the aforementioned logic switch 7 and also two further logic switches 14 and 15. The look angle demand signal LJn is fed via a series arrangement of two limiters 16 and 17 to both a combining device 18 and to an output line 30 of the illustrated part of the control system. The limiter 16 sets one of two lower limits Lij and LOJ for LJn, the particular limit chosen being set by switch 15. Meanwhile, a fixed upper limit for LJn is provided by limiter 17. The output Ljd from 17 is the demand in one axis. A computation by device 18 using the outputs Ød from 6 and LJd from 17 gives L'Hd where L'Hd=LJd tan Ød The error between L'Hd and LHn is the input to a limiter 19 controlled by switch 14. The output of limiter 19 is added to L'Hd and is the demand for the other axis LHd.

The output from converter 1 gives a measure of the angle between the raw demanded look angle direction and the current direction of the field-of-view slit. This is used after some modification to provide an error signal to drive the missile roll demands. Using the raw look angle demands instead of the measured look angle to drive the rolling motion of the missile has the advantage of providing the missile with advanced warning of the intended rolling motion so the missile tends to roll in the right direction long before the measured look angle makes this necessary. In the presence of noise and roll limiting by limiter 6 the demands Pd can change sign rapidly causing time to be lost before the missile is demanded to roll in the correct direction for instance if the demands are near ±π.rad. The function performed by blocks 2, 3, 4, and 5 in the drawing tend to reduce this by keeping the demand nearly fixed when the demands are near ±π radians and the limiter 6 is included so that the missile does not roll fast enough to cause an out of plane or underdamped response from a standard autopilot that is responding to Lhd and LJd.

The arrangement of 1, 10, 11, 13 and 12 is used to indicate when the demands and look angle are small enough to make the missile fly momentarily with the target within the axis proximate portion A of the field-of-view, shown in FIG. 1. The output from 12 Bd is false (zero) in this case.

When Bd equals zero i.e. when the target is close to axis X, the rolling of the missile has little consistent effect on the pitching of the missile while the limited H direction look angle capability of the target tracker is sufficient to retain the target. Thus, it is appropriate then to limit the roll control demands to a magnitude equal to Kλ instead of the normal fixed limit Ømax. A similar effect could be achieved by changing the value of the gain Kp given by gain element 8 instead of the limit given by limiter 6. 18 is used to give a demand for LH that matches the roll demand Ød and thus keeps the target near the LJ axis in FIG. 2.

Normally the limits in 19 are set to zero when Bd=1 and opened up when Bd=0 so that the lateral look angle capability of the missile can be used in this case. Similarly for the control of the limits of 16 by 15. The limit 17 is not essential but may be included to slightly extend the missile tracking capability in cases when the field-of-view is needed.

In other words, when the magnitude part X of the polar coordinates of the demanded look angle and/or the actual separation between the target sight line and missile axis, exceeds the respective limits imposed by limiters 10 and 11, the signal Bd from gate 12 is logical 1 whereby the limits imposed by limiter 19 are each zero, i.e. the limiter does not pass on the signal received thereby and the output demand signal LHd is equal to the output signal provided by combiner 18. Meanwhile the negative limit of LJd is reduced in magnitude while the limit set by limiter 6 is at its higher value Ømax. In this state then, a certain proportion of the control of the missile to achieve apparent movement of the target to the demanded position relative to the missile is achieved by rolling the missile, the maximum roll rate set by Ømax being chosen to give adequate stability. When both λ and the actual target/axis separation are less than the respective limits, the proportion of the controlling effect performed by roll control is curtailed while the proportion performed by lateral steering about the yaw and pitch axes of the missile, i.e. cartesian control, is increased. In this state, the Z axis demand signal LHd equals L'Hd plus (Lhn−L'Hd) if (Lhn−L'Hd) is between the limits L1H imposed by limiter 19 at this time, i.e. Lhd equals LHn. If the magnitude of (Lhn−L'Hd) exceeds the L1H, then Lhd equals L'Hd', plus the limit value.

The signal Pd is fed to a roll rate autopilot (not shown) of any suitable known construction and operation. Alternatively, provided that relatively minor changes are introduced into the function by which Pd is produced, for example at the limiter 6, a roll position autopilot could be used. The afore-mentioned reference by Garnell and East illustrates examples of autopilots and the theory of missile control needed to adapt the illustrated arrangement to any particular situation. For example, a suitable roll position autopilot is described in section 6.10 of the reference.

FIG. 2 is illustrated in function block form since it could be implemented by a variety of electro-mechanical or electronic devices of nature that will be clear to those skilled in the art. Advantageously, however, the apparatus is implemented by one or more computer processors, particularly microprocessor devices, and any necessary associated electronics. For this, the blocks in the figure should be regarded as function representative blocks of an overall algorithm rather than discrete items of hardware. The signals LHd and LJd may be fed to two identical autopilots one for pitch and one for yaw control-suitable examples being shown in Garnell and East section 6.3. However, the roll capability of the missile may be improved by advancing the demands in the direction of rotation as a function of roll rate to compensate for the lag produced by the actuator. FIG. 3 shows a possible implementation. Those skilled in the art will recognise that the priorities of roll signals and conditioned steering signals may be varied to advantage for other applications.

The invention claimed is:

1. A homing missile comprising a target tracker and drive motor means for producing relative movement of members comprised in the missile including control members for steering the missile in a lateral direction, the missile being such that said target tracker has a field-of-view which is restricted at any instant to less than an all-round field-of-view and, to compensate for said restriction, said drive motor means is operable for rotating the said restricted field-of-view with respect to the missile roll axis, for example by controlling roll of the missile itself, the missile further comprising a control system connected between said target tracker and said drive motor means and including look-angle demand signal deriving means for deriving signals indicative of desired positions of a target relative to the missile, said signals including lateral steering signals and also including angle signals indicative of the angular arguments of the polar coordinates of said desired position, first limiting means connected to said signal deriving means to receive said angle signal and for limiting these signals to between two limit values, signal processing means for receiving said limited angle signals and for forming therefrom signals for controlling the rotation of said field-of-view by said drive means, second limiting means for receiving said lateral steering signals and limiting them to less than a limit value, and combining means connected to said first and second limiting means and said drive motor means and operable for combining the limited angle signals and the limited lateral steering signals to form steering control signals for controlling lateral steering of the missile.

2. A homing missile comprising:
a body part having a longitudinal axis;
a target tracker mounted in said body part and operable for tracking a target to be homed upon by the missile, the target tracker having a field-of-view which comprises only a part of an overall field-of-view extending all around said axis;
drive means on-board said missile for steering said missile laterally with respect to said axis and for rotating said body part about said axis to vary the position of said field-of-view of said tracker through said overall field-of-view; and
a control system which is connected between said target tracker and said drive means and which includes means for:
a) deriving look-angle demand data values indicative of a desired position of a target relative to said missile, these data values including a lateral steering data value and an angle data value indicative of the angular argument of the polar co-ordinate of said desired position;
b) limiting said angle data value to between two limit values;
c) forming from said limited angle data value a rotation control signal for controlling said rotation of said body part by said drive means;
d) limiting said lateral steering data value; and
e) combining said limited angle data value and said limited lateral steering data value to form a steering control signal for controlling lateral steering of said missile by said drive means.

3. A missile according to claim 2, wherein said control system comprises computer means which is programmed to carry out functions a) through e).

4. A missile according to claim 2, wherein said control system comprises distinct circuit means for carrying out respective ones of said functions a) through e).

5. A missile according to claim 2, wherein said control system further comprises:
means for deriving a sightline data value indicative of the separation between a target sightline and said longitudinal axis;
means for deriving a magnitude data value indicative of the magnitude of said polar co-ordinates of said desired position;
means for comparing the sightline data value and the magnitude data value with respective predetermined threshold values; and
means for varying, in dependence upon the comparison, the limits imposed upon said angle data value and said lateral steering data value such, that if both the sightline data value and the magnitude data value are less than the respective threshold values, the range of said rotation control signal is reduced while the range of said steering control signal is increased relative to the case where either or both of the sightline data value and the magnitude data value exceed(s) the respective threshold values.

6. A missile according to claim 5, wherein said steering control signal is formed by deriving a data value L'Hd=LJd tan Ød where LJd is said limited lateral steering data value and Ød is said limited angle data value, and by forming a data value LHd which, when either or both of said sightline data value and the magnitude data value exceed(s) the respective threshold values, is equal to L'Hd and which, when both the sightline data value and the magnitude data value are less than the respective threshold values, is equal to L'Hd plus (LHn−L'Hd) if (LHn−L'Hd) lies between two further predetermined limit values or is otherwise equal to L'Hd plus that one of the two further predetermined limit values which is nearest to (LHn−L'Hd), LHn being a further lateral steering direction perpendicular to the direction with which the first-mentioned lateral steering data value is associated.

7. A missile according to claim 2, wherein to rotate said field-of-view with respect to said longitudinal axis, said drive means comprises means for controlling roll of the missile itself, said missile including one of a roll-rate and a roll-position autopilot system connected between said control system and said drive means.

8. A homing missile comprising:
- an elongate body supporting a window at one side of the body and set back from the front of the body;
- a target tracker mounted inside said body and operable for tracking a target seen by the tracker via said window; the window defining for said target tracker a rectangular field-of-view which contains but is asymmetrically disposed with respect to the longitudinal axis of said body;
- steering means mounted on said body for steering the missile laterally with respect to said longitudinal axis and for controlling roll of the body about that axis;
- drive motor means for driving said steering means; and
- a control system connected between said target tracker and said steering and roll control means, the control system including look-angle demand signal deriving means for deriving signals indicative of a desired position of a target relative to the missile, said signals including lateral steering signals and also including angle signals indicative of the angular arguments of the polar coordinates of said desired position, first limiting means connected to said signal deriving means to receive said angle signals and for limiting these signals to between two limit values, signal processing means connected to said first limiting means and said steering and roll control means and operable for receiving said limited angle signals and for forming therefrom signals for controlling said roll of said body, second limiting means for receiving said lateral steering signals and limiting them to less than a limit value, and combining means connected to said first and second limiting means and said steering and roll control means and operable for combining the limited angle signals and the limited lateral steering signals to form steering control signals for controlling lateral steering of the missile.

\* \* \* \* \*